United States Patent
Shimokawa

(10) Patent No.: US 9,800,060 B2
(45) Date of Patent: Oct. 24, 2017

(54) POWER TRANSMISSION DEVICE

(71) Applicant: FUJITSU LIMITED, Kawasaki-shi, Kanagawa (JP)

(72) Inventor: Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 391 days.

(21) Appl. No.: 14/485,889

(22) Filed: Sep. 15, 2014

(65) Prior Publication Data
US 2015/0001959 A1    Jan. 1, 2015

Related U.S. Application Data

(63) Continuation of application No. PCT/JP2012/058066, filed on Mar. 28, 2012.

(51) Int. Cl.
| H01F 27/42 | (2006.01) |
| H01F 37/00 | (2006.01) |
| H01F 38/00 | (2006.01) |
| H02J 5/00  | (2016.01) |
| H02J 17/00 | (2006.01) |

(52) U.S. Cl.
CPC .............. *H02J 5/005* (2013.01); *H02J 17/00* (2013.01)

(58) Field of Classification Search
CPC .. H02J 17/00; H02J 50/00–50/90; H02J 5/005
USPC ........................................................ 307/104
See application file for complete search history.

(56) References Cited

U.S. PATENT DOCUMENTS

| 2010/0123452 A1* | 5/2010  | Amano ................. B60L 11/182 323/359 |
| 2011/0169337 A1  | 7/2011  | Kozakai |
| 2011/0241440 A1  | 10/2011 | Sakoda et al. |
| 2011/0248572 A1  | 10/2011 | Kozakai et al. |
| 2012/0248889 A1* | 10/2012 | Fukushi ................. H02J 17/00 307/104 |

FOREIGN PATENT DOCUMENTS

| JP | 2010-124522 | 6/2010 |
| JP | 2010-141976 | 6/2010 |

(Continued)

OTHER PUBLICATIONS

International Search Report, mailed in connection with PCT/JP2012/058066 and dated Dec. 11, 2012.

(Continued)

*Primary Examiner* — Carlos Amaya
(74) *Attorney, Agent, or Firm* — Fujitsu Patent Center

(57) ABSTRACT

A power transmission device includes: a power supply circuit that generates an alternating voltage; a power transmission coil that receives an alternating voltage generated by the power supply circuit to thereby generate a magnetic field; a power transmission resonator that includes: a resonant coil; and a resonant capacitor and through which electromagnetic induction causes an electric current to flow when a magnetic field is generated by the power transmission coil to enter a resonance state; and a control circuit that controls the position or the orientation of the power transmission coil with respect to the power transmission resonator in the direction in which a standing wave ratio in a transmission line from the power supply circuit to the power transmission coil decreases.

6 Claims, 4 Drawing Sheets

(56) References Cited

FOREIGN PATENT DOCUMENTS

| JP | 2010-252497 | 11/2010 |
|----|-------------|---------|
| JP | 2010-252498 | 11/2010 |
| JP | 2011-142559 | 7/2011 |
| JP | 2011-155733 | 8/2011 |
| JP | 2011155733 A * | 8/2011 |
| JP | 2011-223739 | 11/2011 |
| WO | 2011/114942 | 9/2011 |

OTHER PUBLICATIONS

Notification of Transmittal of Translation of the International Preliminary Report on Patentability (Form PCT/IB/338, Form PCT/IB/373 & Form PCT/ISA/237), PCT/JP2012/058066, 8 pages, dated Oct. 9, 2014.

* cited by examiner

F I G. 4
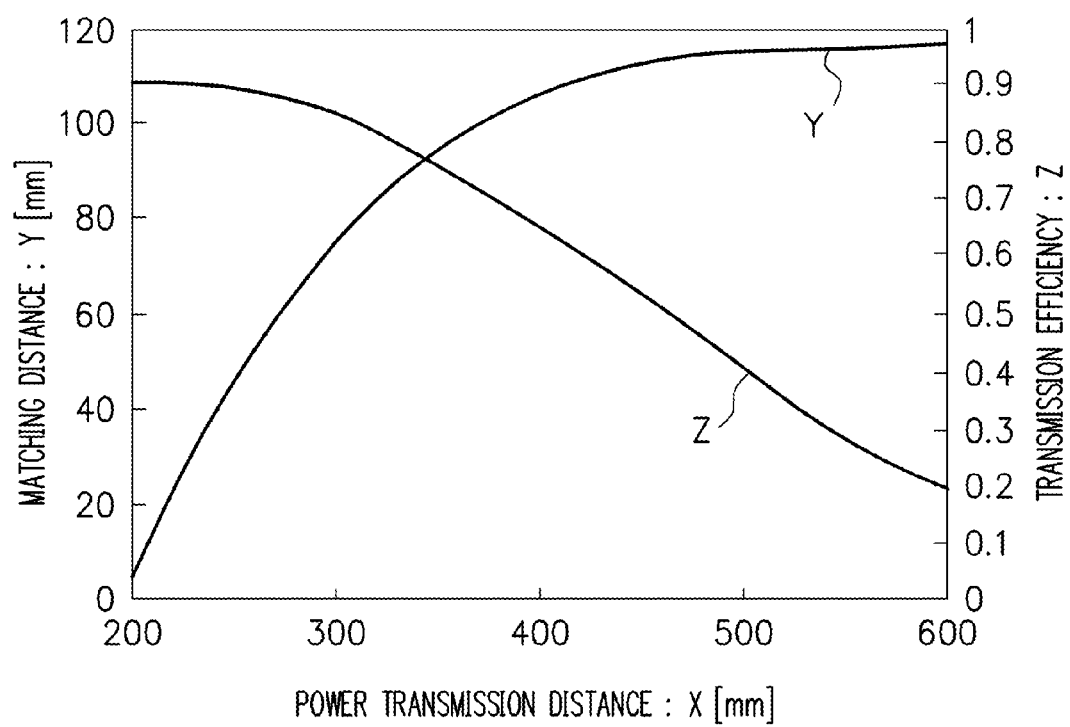

POWER TRANSMISSION DEVICE

CROSS-REFERENCE TO RELATED APPLICATION

This application is a continuation application of International Application PCT/JP2012/058066 filed on Mar. 28, 2012 and designated the U.S., the entire contents of which are incorporated herein by reference.

FIELD

The embodiments discussed herein are directed to a power transmission device.

BACKGROUND

There has been known a power feed device including: a power generator generating power that should be fed; a power feed element formed of a coil to which power generated by the power generator is fed; a resonance element coupled to the power feed element by electromagnetic induction; and a variable matching unit including a function for impedance matching at a point of feed of the power to the power feed element, in which the power feed element is formed so that a diameter thereof can be changed, and the variable matching unit can change the diameter of the power feed element (see Patent Document 1, for example).

Further, there has been known a power feeding apparatus including: a power generator generating power that should be fed; a power transmission element to which power generated by the power generator is fed; an impedance detector detecting an impedance on the power feeding side; a variable matching unit including a function for impedance matching at a point of feed of the power to the power transmission element; a storage unit storing impedance characteristic estimation information for estimating an impedance characteristic on the power reception side from an impedance characteristic on the power transmission side therein as a reference table; and a control unit obtaining a state of the variable matching unit that should be adjusted from at least information on detected impedance and information on the reference table in the storage unit and outputting a control signal to the variable matching unit so as to be in the obtained state (see Patent Document 2, for example).

Further, there has been known a non-contact power transmission apparatus including: an AC power supply; a primary coil connected to the AC power supply; a primary side resonant coil; a secondary side resonant coil; a secondary coil; a load connected to the secondary coil; and an impedance variable circuit provided between the AC power supply and the primary coil, in which the primary coil, the primary side resonant coil, the secondary side resonant coil, the secondary coil, and the load constitute a resonant system and include a state detecting means to detect a state of the resonant system, and in the impedance variable circuit, an impedance is adjusted so that an input impedance in a resonant frequency of the resonant system and an impedance on the AC power supply side rather than the primary coil may be matched based on a detection result of the state detecting means (see Patent Document 3, for example).

Further, there has been known a radio power transfer device being a radio power transfer device to transmit power by generating magnetic field resonance between a power transmission unit including a power transmission coil and a power reception unit including a power reception coil, the radio power transfer device including: a changing means that changes transfer efficiency of power by changing a predetermined power transmission/reception element provided in either the power transmission unit or the power reception unit; a transfer efficiency calculating means that calculates transfer efficiency before and after the change by the changing means; and a judging means that judges whether or not the transfer efficiency is improved after the change by comparing the transfer efficiency before the change and the transfer efficiency after the change that are calculated by the transfer efficiency calculating means, in which the judgment by the judging means and the change by the changing means are performed repeatedly, to thereby improve the transfer efficiency (see Patent Document 4, for example).

PRIOR ART DOCUMENT

Patent Document

[Patent Document 1] Japanese Laid-open Patent Publication No. 2011-142559
[Patent Document 2] Japanese Laid-open Patent Publication No. 2011-223739
[Patent Document 3] Japanese Laid-open Patent Publication No. 2010-141976
[Patent Document 4] Japanese Laid-open Patent Publication No. 2010-252497

In a power supply system by a magnetic field resonance method, a power reception device can wirelessly receive power at a free position with respect to a power transmission device. However, when the position of the power reception device changes, an impedance changes, impedance matching cannot be taken, a reflected wave of transmission power is increased, and thereby transmission efficiency deteriorates.

SUMMARY

A power transmission device includes: a power supply circuit that generates an alternating voltage; a power transmission coil that receives an alternating voltage generated by the power supply circuit to thereby generate a magnetic field; a power transmission resonator that includes: a resonant coil; and a resonant capacitor and through which electromagnetic induction causes an electric current to flow when a magnetic field is generated by the power transmission coil to enter a resonance state; and a control circuit that controls the position or the orientation of the power transmission coil with respect to the power transmission resonator in the direction in which a standing wave ratio in a transmission line from the power supply circuit to the power transmission coil decreases.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a graph illustrating conversion tables stored in a first memory and a second memory.

DESCRIPTION OF EMBODIMENTS

First Embodiment

Figure 1:
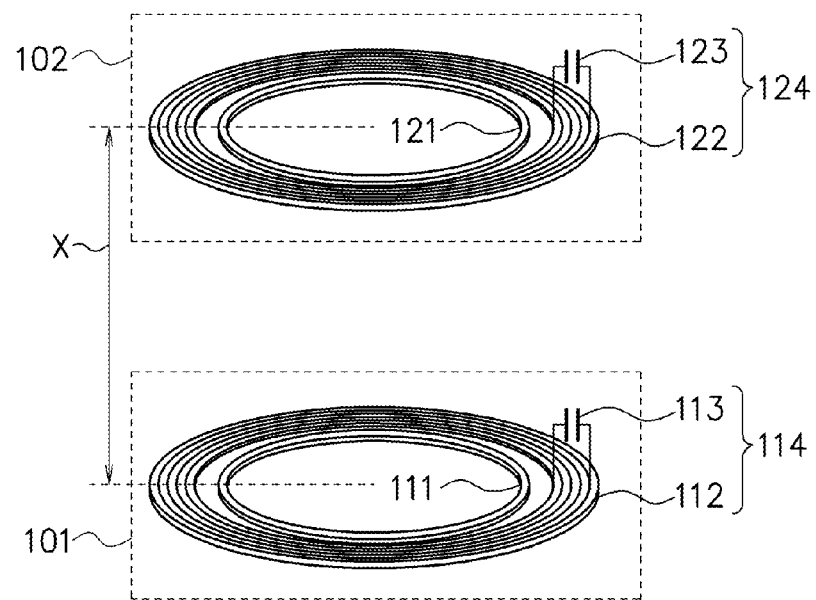
FIG. 1 is a view illustrating a structural example of a power transmission unit and a power reception unit according to a first embodiment.

FIG. 1 is a view illustrating a structural example of a power transmission unit 101 and a power reception unit 102 according to a first embodiment. The power transmission unit 101 has an inner power transmission coil 111 and an outer power transmission resonator 114. The power transmission resonator 114 has a series connection circuit with a resonant coil 112 and a resonant capacitor 113, and a resonance frequency thereof is $1/\{2\times\pi\times\sqrt{(L\times C)}\}$. Here, L is inductance of the power transmission resonator 114 and C is capacitance of the power transmission resonator 114. Of the power transmission coil 111, for example, the number of turns is one and an outside diameter is 209 mm. Of the resonant coil 112, for example, the number of turns is five, an outside diameter is 300 mm, and a winding pitch is 6 mm.

The power reception unit 102 has an inner power reception coil 121 and an outer power reception resonator 124. The power reception resonator 124 has a series connection circuit with a resonant coil 122 and a resonant capacitor 123, and a resonance frequency thereof is $1/\{2\times\pi\times\sqrt{(L\times C)}\}$. Here, L is inductance of the power reception resonator 124 and C is capacitance of the power reception resonator 124. Of the resonant coil 122, for example, the number of turns is five, an outside diameter is 300 mm, and a winding pitch is 6 mm. Of the power reception coil 121, for example, the number of turns is one and an outside diameter is 209 mm.

With regard to each of the coils 111, 112, 121, and 122, a diameter of a coil wire is 3 mm, for example.

The power transmission unit 101 can perform wireless power transmission to the power reception unit 102. A high-frequency alternating voltage is applied to the power transmission coil 111 by a power supply circuit. Of the power supply circuit, the frequency of the output alternating voltage is 2 MHz, for example, and an output impedance is 50Ω, for example. Then, a magnetic field occurs in the power transmission coil 111, and electromagnetic induction causes an electric current to flow through the power transmission resonator 114. Since the frequency of the alternating voltage applied by the power supply circuit is the resonance frequency of $1/\{2\times\pi\times\sqrt{(L\times C)}\}$, the power transmission resonator 114 enters a resonance state. Then, a magnetic field occurs in the power transmission resonator 114, magnetic field resonance with the resonance frequency of $1/\{2\times\pi\times\sqrt{(L\times C)}\}$ causes an electric current to flow through the power reception resonator 124, and the power reception resonator 124 enters a resonance state. Then, a magnetic field occurs in the power reception resonator 124, and electromagnetic induction causes an electric current to flow through the power reception coil 121. A load is connected to the power reception coil 121, thus making it possible to supply power to the load. Resistance of the load is 10Ω, for example.

As above, the power transmission unit 101 can wirelessly transmit power to the power reception unit 102 by magnetic field resonance in a non-contact manner. A power transmission distance X is a distance between the power transmission unit 101 and the power reception unit 102. In a power supply system, power can be transmitted up to the power transmission distance X of several meters or so at the maximum.

Figure 2:
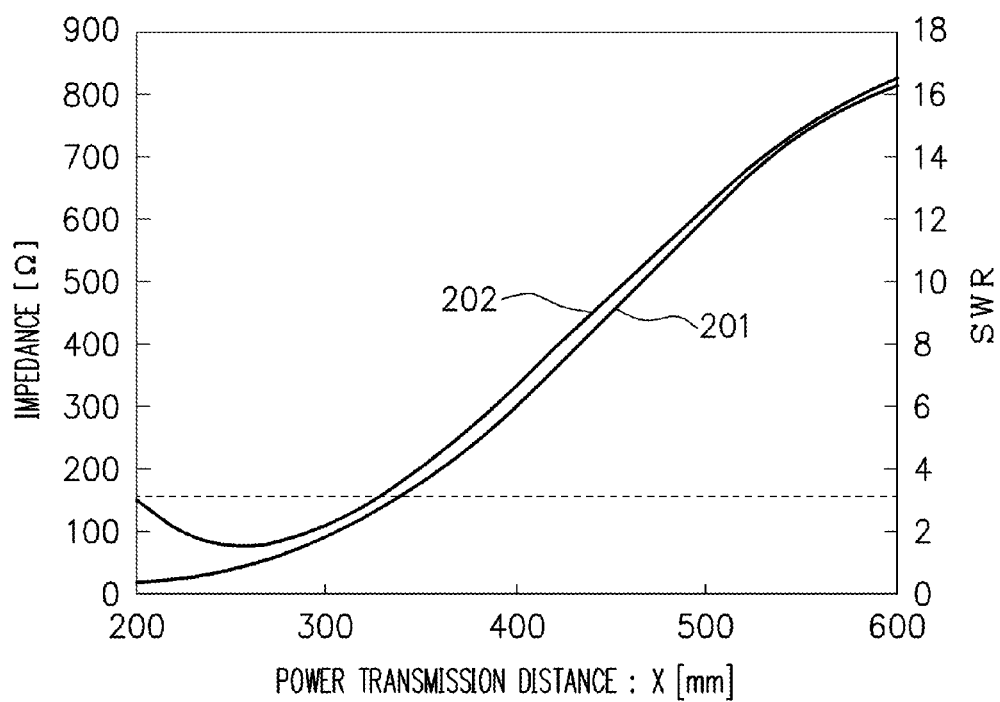
FIG. 2 is a graph illustrating an impedance and a standing wave ratio with respect to a power transmission distance between the power transmission unit and the power reception unit in FIG. 1.

FIG. 2 is a graph illustrating an impedance 201 and a standing wave ratio (SWR: Standing Wave Ratio) 202 with respect to the power transmission distance X between the power transmission unit 101 and the power reception unit 102 in FIG. 1. The impedance 201 and the standing wave ratio 202 of which the power transmission distance X is changed from 200 mm to 600 mm are illustrated. The impedance 201 is a synthetic impedance of the power transmission unit 101 and the power reception unit 102. The standing wave ratio 202 is a standing wave ratio in a transmission line from the power supply circuit to the power transmission coil 111 to express the magnitude of a reflected wave to a traveling wave. When amplitude of the reflected wave is 0, the standing wave ratio 202 becomes the minimum value of "1," and the larger the amplitude of the reflected wave becomes, the more the standing wave ratio 202 increases. When the standing wave ratio 202 increases, due to the large amplitude of the reflected wave, the traveling wave is attenuated by the reflected wave, resulting in that transmission efficiency (power transmission efficiency) deteriorates.

The output impedance of the power supply circuit is 50Ω, for example. In this case, when the synthetic impedance 201 of the power transmission unit 101 and the power reception unit 102 becomes 50Ω, which is the same as the output impedance of the power supply circuit, impedance matching can be taken. In the case of the power transmission distance X in FIG. 2 being about 260 mm, for example, the synthetic impedance 201 of the power transmission unit 101 and the power reception unit 102 becomes 50Ω, an impedance matching state is achieved, the amplitude of the reflected wave becomes about 0, and the standing wave ratio 202 becomes the minimum value of about "1."

The power reception unit 102 can wirelessly receive power at a free position with respect to the power transmission unit 101. Thus, the power transmission distance X is a changeable value.

When the power transmission distance X becomes shorter than about 260 mm, the synthetic impedance 201 becomes smaller than 50Ω, impedance mismatching is caused, the standing wave ratio 202 increases, and the transmission efficiency deteriorates. In contrast to this, when the power transmission distance X becomes longer than about 260 mm, the synthetic impedance 201 becomes larger than 50Ω, impedance mismatching is caused, the standing wave ratio 202 increases, and the transmission efficiency deteriorates. Thus, there is desired a technique in which even when the power transmission distance X is changed, by adjustment of the synthetic impedance 201, the standing wave ratio 202 is made the minimum value to thereby improve the transmission efficiency. Practically, the impedance matching is preferably adjusted so that the standing wave ratio 202 can be equal to or less than "3."

Further, the power reception unit 102 is driven by certain rated power, to thus need to receive rated power. In order to achieve it, the power transmission unit 101 needs to perform power transmission with a power value such that the power reception unit 102 receives rated power. However, when the power transmission distance X changes, the transmission efficiency changes eventually. Generally, when the power transmission distance X is short, the transmission efficiency is high, and when the power transmission distance X is long, the transmission efficiency becomes low. Thus, when the power transmission unit 101 transmits a certain power value, in the case of the power transmission distance X being short, reception power of the power reception unit 102 increases, and in the case of the power transmission distance X being long, reception power of the power reception unit 102 decreases. Thus, in order for the power reception unit 102 to receive certain rated power, the power transmission unit 101 needs to change the transmission power value according to the power transmission distance X. On this occasion, the power transmission distance X is unclear, so that a technique to detect the power transmission distance X is desirably established.

Hereinafter, in this embodiment, there is explained a method of adjusting the impedance 201 so as to make the standing wave ratio 202 become the minimum value, detecting the power transmission distance X, and controlling the transmission power value according to the power transmission distance X.

Figure 3:
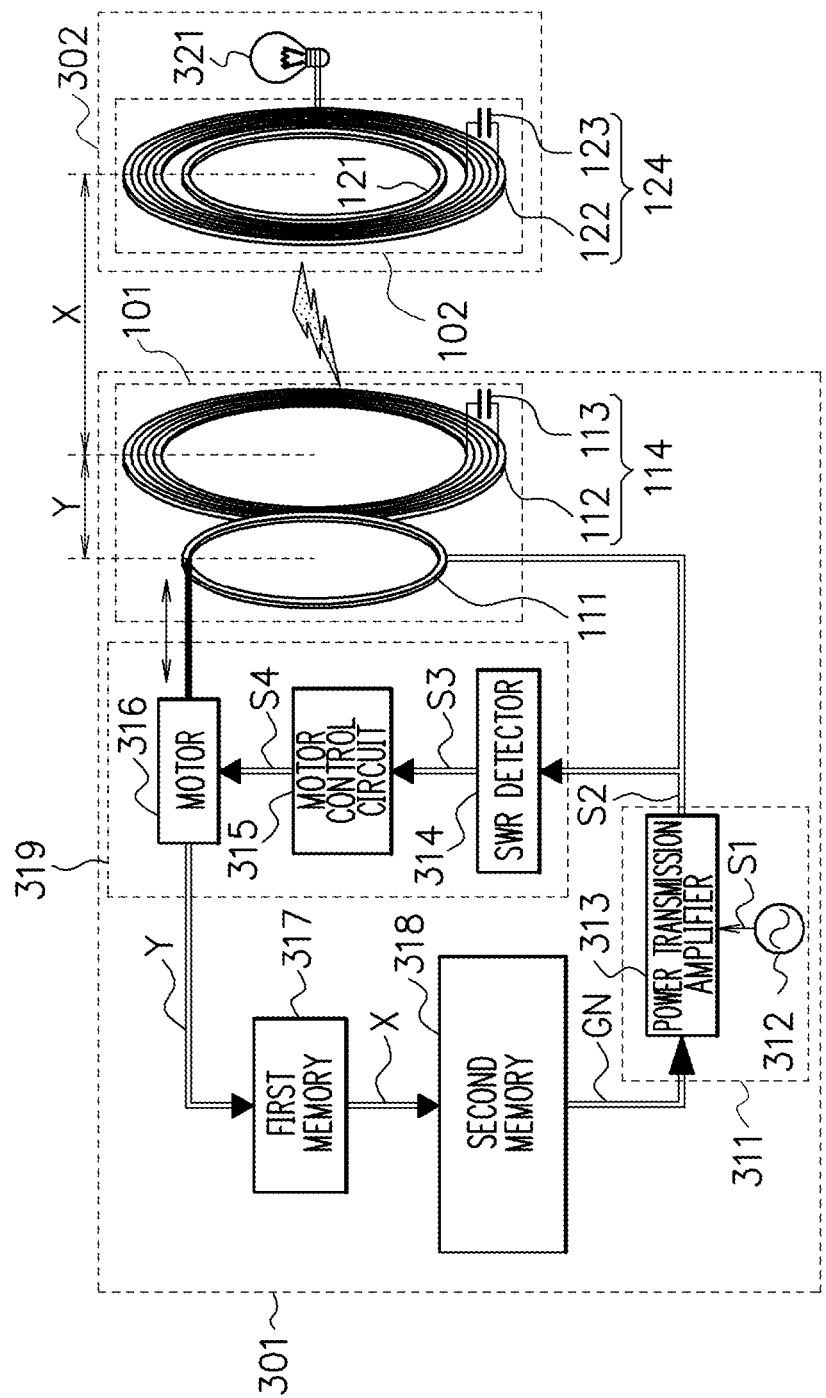
FIG. 3 is a view illustrating a structural example of a power supply system according to the first embodiment.

FIG. 3 is a view illustrating a structural example of a power supply system according to the first embodiment. The power supply system has a power transmission device 301 and a power reception device 302. The power transmission device 301 has a power supply circuit 311, a control circuit 319, a power transmission unit 101, a first memory 317, and a second memory 318. The power transmission unit 101 has the same structure as that of the power transmission unit 101 in FIG. 1, and has a power transmission coil 111 and a power transmission resonator 114. The power transmission resonator 114 has a series connection circuit with a resonant coil 112 and a resonant capacitor 113.

The power reception device 302 has a power reception unit 102 and a load 321. The power reception unit 102 has the same structure as that of the power reception unit 102 in FIG. 1, and has a power reception coil 121 and a power reception resonator 124. The power reception resonator 124 has a series connection circuit with a resonant coil 122 and a resonant capacitor 123. The load 321 is connected to the power reception coil 121.

The power supply circuit 311 has an oscillator 312 and a power transmission amplifier 313 to generate an alternating voltage S2. The oscillator 312 generates a high-frequency alternating voltage S1 by oscillation. The power transmission amplifier 313 amplifies the alternating voltage S1 by a gain GN to output the alternating voltage S2 obtained by the amplification of the alternating voltage S1 to the power transmission coil 111.

The power transmission coil 111 receives the alternating voltage S2 generated by the power supply circuit 311 to thereby generate a magnetic field. When a magnetic field is generated by the power transmission coil 111, electromagnetic induction causes an electric current to flow through the power transmission resonator 114 and the power transmission resonator 114 enters a resonance state. That is, the frequency of the alternating voltage applied by the power supply circuit 311 is the resonance frequency of $1/\{2 \times \pi \times \sqrt{(L \times C)}\}$, so that the power transmission resonator 114 enters a resonance state. Then, a magnetic filed occurs in the power transmission resonator 114, magnetic field resonance with the resonance frequency of $1/\{2 \times \pi \times \sqrt{(L \times C)}\}$ causes an electric current to flow through the power reception resonator 124, and the power reception resonator 124 enters a resonance state. Then, a magnetic field occurs in the power reception resonator 124, and electromagnetic induction causes an electric current to flow through the power reception coil 121. The power reception coil 121 supplies received power to the load 321. The load 321 receives the power supply to light up, for example.

The control circuit 319 has a standing wave ratio detector 314, a motor control circuit 315, and a motor 316. The standing wave ratio detector 314 detects a standing wave ratio in a transmission line from the power supply circuit 311 to the power transmission coil 111. Concretely, the standing wave ratio detector 314 detects a traveling wave and a reflected wave in the transmission line from the power supply circuit 311 to the power transmission coil 111 and calculates a standing wave ratio S3 based on amplitude of the traveling wave and amplitude of the reflected wave to output the standing wave ratio S3. The motor 316 controls the position of the power transmission coil 111 with respect to the power transmission resonator 114. That is, the motor 316 controls a matching distance Y. The matching distance Y is a distance between the power transmission coil 111 and the power transmission resonator 114. When the motor 316 changes the matching distance Y, a synthetic impedance 201 of the power transmission unit 101 and the power reception unit 102 changes and a standing wave ratio 202 changes.

An output impedance of the power supply circuit 311 is 50Ω, for example. In this case, when the synthetic impedance 201 of the power transmission unit 101 and the power reception unit 102 becomes 50Ω, which is the same as the output impedance of the power supply circuit 311, impedance matching can be taken. Thus, when the motor 316 controls the matching distance Y to make the synthetic impedance 201 of the power transmission unit 101 and the power reception unit 102 become 50Ω, the standing wave ratio S3 that the standing wave ratio detector 314 detects becomes the minimum value of "1."

The motor control circuit 315 receives the standing wave ratio S3 and outputs, to the motor 316, a drive signal S4 for controlling the position of the power transmission coil 111 in the direction in which the standing wave ratio S3 decreases. That is, the motor control circuit 315 outputs, to the motor 316, the drive signal S4 for controlling the position of the power transmission coil 111 to the matching distance Y such that the standing wave ratio S3 becomes the minimum value by feedback control. The motor 316 controls the position of the power transmission coil 111 according to the drive signal S4. Further, the motor 316 has a position sensor to detect its own control amount and outputs information on the matching distance Y corresponding to the current position of the power transmission coil 111 to the first memory 317.

The first memory 317 converts the information on the matching distance Y output by the motor 316 into a power transmission distance X to output the power transmission distance X to the second memory 318. The power transmission distance X is a distance between the power transmission resonator 114 and the power reception resonator 124. That is, the first memory 317 outputs the distance X between the power transmission resonator 114 and the power reception resonator 124 based on the position of the power transmission coil 111 controlled by the control circuit 319. Details of the above are explained later with reference to FIG. 4.

The second memory 318 outputs transmission efficiency from the power transmission device 301 to the power reception device 302 based on the distance X between the power transmission resonator 114 and the power reception resonator 124 output by the first memory 317. Further, the second memory 318 outputs, to the power transmission amplifier 313, the gain GN for the power reception device 302 to receive certain target power, based on the transmission efficiency. Details of the above are explained later with reference to FIG. 4. The power transmission amplifier 313 amplifies the alternating voltage S1 by the gain GN to output the alternating voltage S2. Thereby, the power reception device 302 can always receive certain target power even when the power transmission distance X changes.

FIG. 4 is a graph illustrating conversion tables stored in the first memory 317 and the second memory 318. The first memory 317 stores the conversion table for converting the matching distance Y into the power transmission distance X therein. When the standing wave ratio S3 is controlled to the minimum value, the relationship between the matching distance Y and the power transmission distance X is uniquely determined as illustrated in FIG. 4.

The second memory 318 stores the conversion table for converting the power transmission distance X into transmission efficiency Z therein. The transmission efficiency Z is expressed by the ratio of reception power of the load 321 in the power reception device 302 and transmission power of the power supply circuit 311 in the power transmission device 301. The relationship between the power transmission distance X and the transmission efficiency Z is uniquely determined as depicted in FIG. 4. These conversion tables are formed by a simulation performed in advance or by actual measurement.

The first memory 317 converts the matching distance Y output by the motor 316 into the power transmission distance X by using the conversion table in FIG. 4 to output the power transmission distance X to the second memory 318. The second memory 318 converts the power transmission distance X output by the first memory 317 into the transmission efficiency Z by using the conversion table in FIG. 4. Further, the second memory 318 outputs the gain GN for the power reception device 302 to receive certain target power based on the transmission efficiency Z. In order for the power reception device 302 to receive certain power, the power transmission device 301 only needs to increase the gain GN to transmit large power when the transmission efficiency Z is low, and only needs to decrease the gain GN to transmit small power when the transmission Z is high. Thus, the second memory 318 may also obtain the gain GN by an arithmetic expression using an inverse number of the transmission efficiency X as a coefficient.

The power transmission amplifier 313 amplifies the alternating voltage S1 by the gain GN to output the alternating voltage S2, and thereby the load 321 in the power reception device 302 can always receive certain power even though the power transmission distance X changes. Further, the matching distance Y is controlled so that the standing wave ratio S3 may become the minimum value, so that the reflected wave of transmission power can be suppressed to improve the transmission efficiency.

Incidentally, the case where the motor 316 controls the position of the power transmission coil 111 (moves straight, for example) has been explained as an example, but it is also possible to control the orientation (for example, rotation) of the power transmission coil 111. Even if the orientation of the power transmission coil 111 is changed, the synthetic impedance 201 of the power transmission unit 101 and the power reception unit 102 changes and the standing wave ratio 202 also changes, so that the same effect as that of the above can be obtained.

According to this embodiment, the control circuit 319 controls the position or the orientation of the power transmission coil 111 with respect to the power transmission resonator 114 in the direction in which the standing wave ratio S3 in the transmission line from the power supply circuit 311 to the power transmission coil 111 decreases, and thereby the standing wave ratio S3 can be made minimum to improve the transmission efficiency. Further, the power supply circuit 311 amplifies the alternating voltage S1 by the gain GN according to the position or the orientation of the power transmission coil 111 controlled by the control circuit 319 by using the first memory 317 and the second memory 318 to output an amplified alternating voltage, thereby enabling the power reception device 302 to receive certain power even when the power transmission distance X changes.

Second Embodiment

Figure 5:
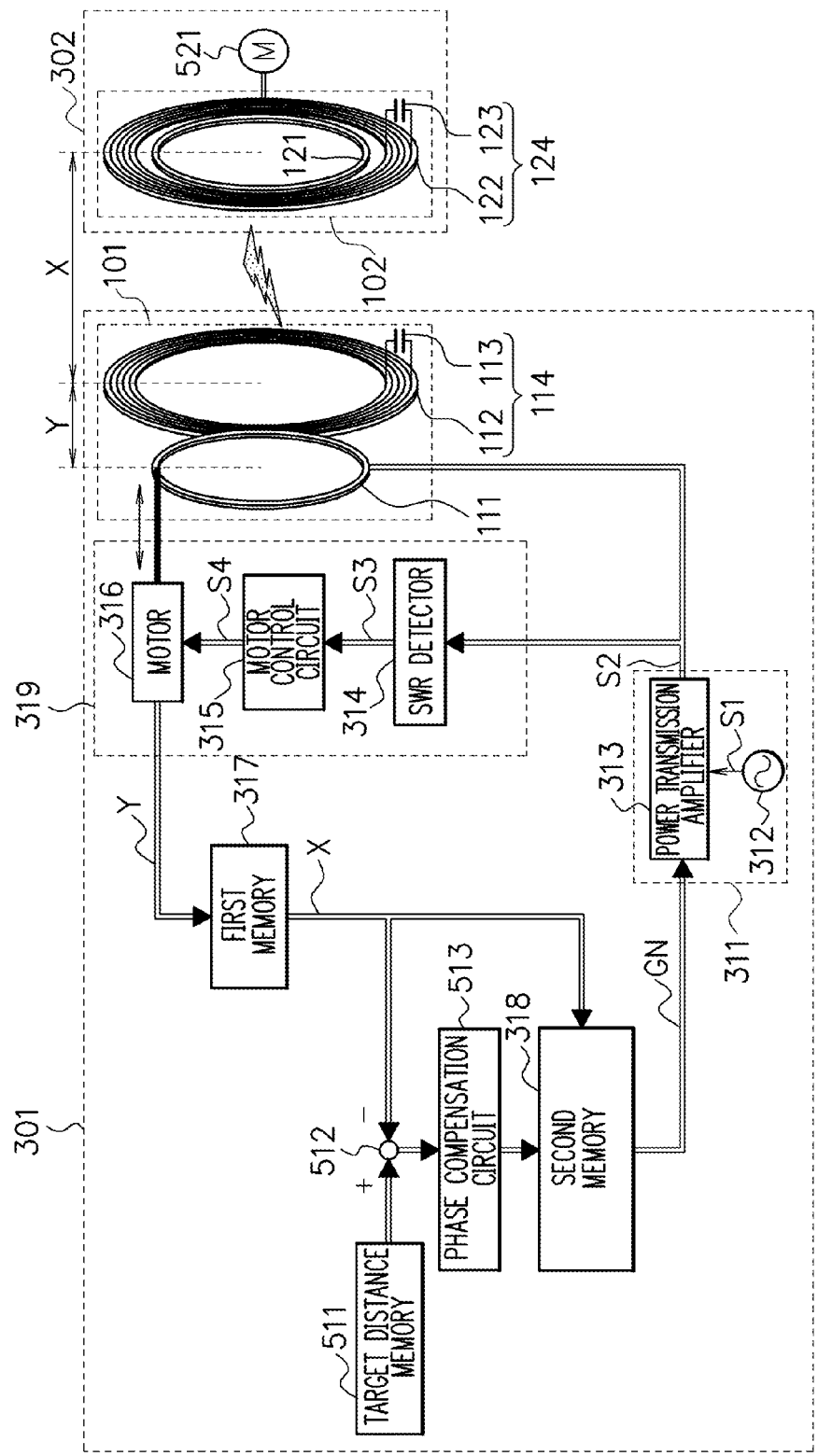
FIG. 5 is a view illustrating a structural example of a power supply system according to a second embodiment.

FIG. 5 is a view illustrating a structural example of a power supply system according to a second embodiment. Hereinafter, there are explained points of which the second embodiment (FIG. 5) is different from the first embodiment (FIG. 3). A power reception device 302 has a motor 521 in place of the load 321 in FIG. 3. The motor 521 is connected to a power reception coil 121. The power reception coil 121 supplies received power to the motor 521. The motor 521 moves the power reception device 302 to the position according to the magnitude of supplied power. The power reception device 302 is a model helicopter, for example, and flies up to an altitude according to the magnitude of received power. A power transmission device 301 controls a transmission power value, to thereby be able to control the altitude of the power reception device 302. In this case, the power transmission device 301 needs to transmit power for the power reception device 302 to move up to a target altitude. The altitude of the power reception device 302 corresponds to the power transmission distance X. Thus, the power transmission device 301 only needs to transmit power such that the power transmission distance X is made a target distance.

The power transmission device 301 further has a target distance memory 511, a subtractor 512, and a phase compensation circuit 513. The target distance memory 511 stores a target distance X0 therein. The power transmission device 301 can transmit power such that the power transmission distance X is made the target distance X0. The subtractor 512 outputs a value X1 obtained by subtracting the power transmission distance X output by a first memory 317 from the target distance X0. The phase compensation circuit 513 performs phase compensation based on the value X1, and output of the phase compensation circuit 513 is input to a second memory 318.

The subtractor 512 outputs the difference value X1 between the power transmission distance X output by the first memory 317 and the target distance X0, and a negative feedback such that the difference value X1 is suppressed to "0" is constituted. The difference value X1 is input to the phase compensation circuit 513. The phase compensation circuit 513 is designed so that a feedback loop can be stabilized in consideration of responsivity of a motor 316 and dynamic characteristic of the power reception device 302. The output of the phase compensation circuit 513 is input to the second memory 318. The second memory 318 outputs transmission efficiency Z in the same manner as in the first embodiment, and further outputs a gain GN based on the transmission efficiency Z. The gain GN is controlled to a gain such that the power transmission distance X is made the target distance X0. A power transmission amplifier 313 amplifies an alternating voltage S1 by the gain GN to output an alternating voltage S2. The motor 521 of the power reception device 302 controls the position of the power reception device 302 according to a reception power value.

As a result, the power reception device 302 is controlled to the position where the power transmission distance X is made the target distance X0.

As above, a power supply circuit 311 amplifies the alternating voltage S1 by the gain GN such that the difference value X1 between the power transmission distance X output by the first memory 317 and the target distance X0 approaches 0 and outputs an amplified alternating voltage. The subtractor 512 outputs the difference value X1 between the power transmission distance X output by the first memory 317 and the target distance X0. The phase compensation circuit 513 compensates a phase based on the difference value X1 output by the subtractor 512, to thereby make it possible to stabilize the feedback control.

Incidentally, the first and second embodiments have been explained on the condition that only by the operation of the power transmission device 301, the adjustment of the synthetic impedance 201 and the control of reception power of the power reception device 302 are both performed basically, but a communication means between the power transmission device 301 and the power reception device 302 may also be used as a supplementary means additionally. Further, with regard to the detection of the power transmission distance X, a supplementary means such as a distance sensor may also be used additionally.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

By controlling the position or the orientation of the power transmission coil, the reflected wave of transmission power can be suppressed to improve the transmission efficiency.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power transmission device, comprising:
a power supply circuit that generates an alternating voltage;
a power transmission coil that receives an alternating voltage generated by the power supply circuit to thereby generate a magnetic field;
a power transmission resonator that comprises a resonant coil and a resonant capacitor and through which electromagnetic induction causes an electric current to flow when a magnetic field is generated by the power transmission coil to enter a resonance state; and
a control circuit that controls the position or the orientation of the power transmission coil with respect to the power transmission resonator in the direction in which a standing wave ratio in a transmission line from the power supply circuit to the power transmission coil decreases, wherein
the power supply circuit amplifies an alternating voltage by a gain according to the position or the orientation of the power transmission coil controlled by the control circuit to output an amplified alternating voltage.

2. A power transmission device, comprising:
a power supply circuit that generates an alternating voltage;
a power transmission coil that receives an alternating voltage generated by the power supply circuit to thereby generate a magnetic field;
a power transmission resonator that comprises a resonant coil and a resonant capacitor and through which electromagnetic induction causes an electric current to flow when a magnetic field is generated by the power transmission coil to enter a resonance state;
a control circuit that controls the position or the orientation of the power transmission coil with respect to the power transmission resonator in the direction in which a standing wave ratio in a transmission line from the power supply circuit to the power transmission coil decreases; and
a first memory that outputs a distance between the power transmission resonator in the power transmission device and a power reception resonator in a power reception device based on the position or the orientation of the power transmission coil controlled by the control circuit, wherein the power supply circuit amplifies an alternating voltage by a gain according to the distance between the power transmission resonator in the power transmission device and the power reception resonator in the power reception device that is output by the first memory to output an amplified alternating voltage.

3. The power transmission device according to claim 2, further comprising:
a second memory that outputs transmission efficiency from the power transmission device to the power reception device based on the distance between the power transmission resonator in the power transmission device and the power reception resonator in the power reception device that is output by the first memory, wherein
the power supply circuit amplifies an alternating voltage by a gain according to the transmission efficiency output by the second memory to output an amplified alternating voltage.

4. The power transmission device according to claim 1, wherein
the power supply circuit amplifies an alternating voltage by a gain such that a power reception device receives a target power value from the power transmission device to output an amplified alternating voltage.

5. The power transmission device according to claim 2, wherein
the power supply circuit amplifies an alternating voltage by a gain such that a difference between the distance that is output by the first memory and a target distance approaches 0 to output an amplified alternating voltage.

6. The power transmission device according to claim 5, further comprising:
a subtracter that outputs the difference between the distance between the power transmission resonator in the power transmission device and the power reception resonator in the power reception device that is output by the first memory and the target distance; and
a phase compensation circuit that compensates a phase based on the difference output by the subtracter.

* * * * *